Sept. 20, 1938.   C. P. J. M. VAN DER MEER   2,130,751
APPARATUS FOR DETERMINING THE RESISTANCE OF THE GROUND
Filed March 3, 1936
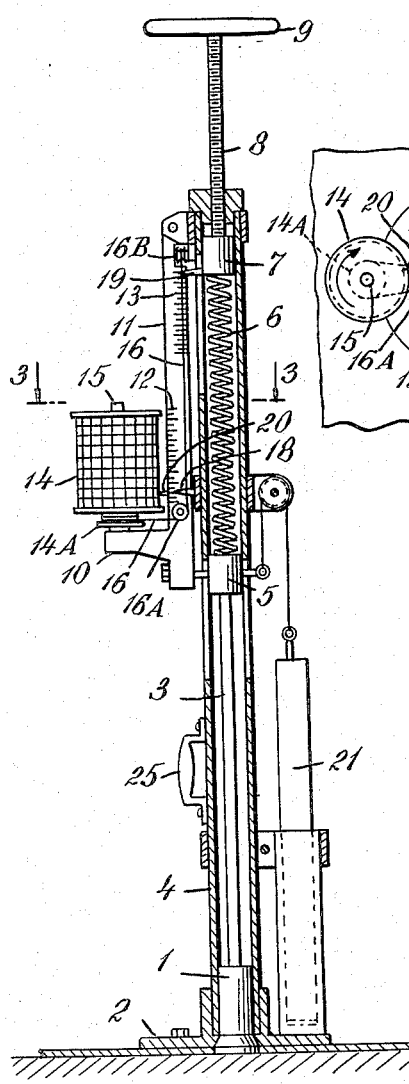
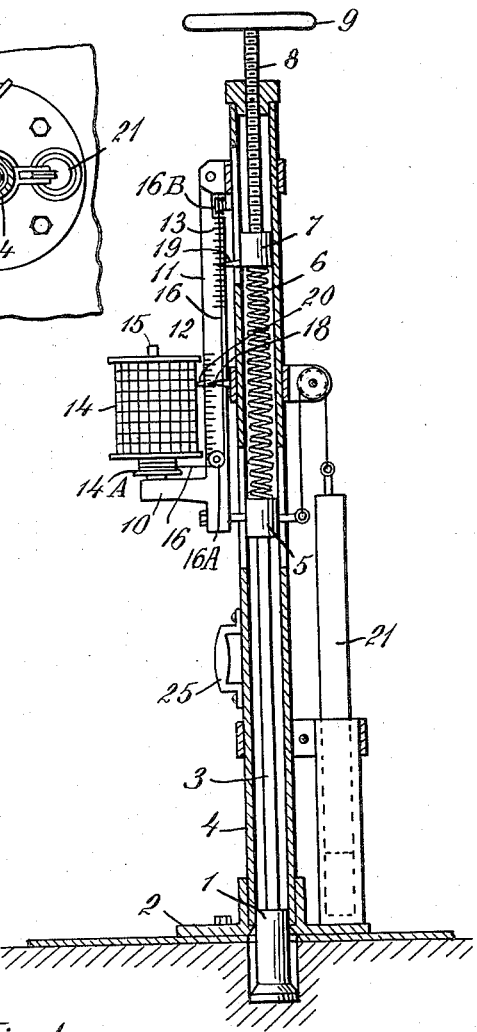
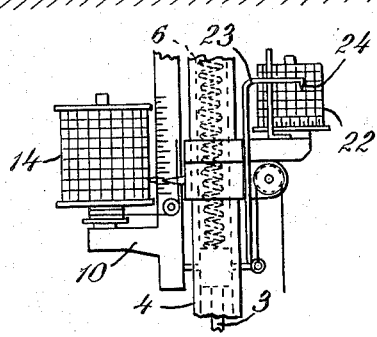
INVENTOR
Constant P. J. M. VanderMeer
BY
Pennie, Davis, Marvin & Edmonds
ATTORNEYS Patented Sept. 20, 1938

2,130,751

UNITED STATES PATENT OFFICE 2,130,751

APPARATUS FOR DETERMINING THE RESISTANCE OF THE GROUND

Constant Pierre Jean Marie Van der Meer, Brussels, Belgium

Application March 3, 1936, Serial No. 66,802
In Belgium March 6, 1935

2 Claims. (Cl. 265—2)

My present invention relates to apparatus used in order to determine the resistance of the ground to the static pressure of structures or works of any kind which it is called upon to support.

The apparatus employed up to the present for determining data of this kind are based on the very approximate observation of the penetration of a table loaded generally by hand or of the penetration of a body falling freely from a certain height.

In the apparatus of the first type a table of known section is used supporting a load of several tons composed either of sacks of sand or cement, or of pig iron. The table not being guided in a rigid manner, is liable to tilt and thus make incorrect the vague indications which it gives.

On the other hand the apparatus based on the free fall of a body give indications which can be disputed seeing that nothing proves that any ground reacts in the same manner under shock and under a static charge.

My present invention has for its object to overcome these inconveniences and to obtain an apparatus which is light and portable, allowing of easy and practical reading of the reactions of the ground to the penetration of a body progressively loaded and also the graphic recording of the different observations.

With this object in view, my invention essentially consists in the special arrangements and combination of parts hereinafter fully described and pointed out in the appended claims.

On the annexed drawing:

Fig. 1 is a vertical section through the apparatus at the moment when it is placed on the ground.

Fig. 2 shows in section this apparatus after the piston has penetrated a certain distance into the ground.

Fig. 3 is a view partly in section taken along the line 3—3 of Fig. 1.

Fig. 4 illustrates the method of mounting a supplementary cylinder for measuring the speed of penetration.

As can be seen from these figures, the apparatus comprises a piston 1 of suitable cross sectional area projecting from a supporting plate 2 placed on the ground and loaded either by the operator himself or by some other load so as to make it rigid. The piston 1 is mounted at the extremity of a rod 3 sliding in a tube 4 and the upper extremity 5 of which is acted upon by a spring 6 compressed by a head 7 receiving the thrust of a screw 8 actuated by a hand wheel 9.

The extremity 5 of the rod 3 is rigidly connected with a carriage 10 carrying on the one hand two scales 12 and 13 and on the other hand a cylinder 14 capable of turning about its vertical axis 15, and the cylinder 14 is provided with a drum or pulley 14A over which is looped an endless cord 16 which passes upwardly over the pulleys 16A and thence downwardly over the upper pulleys 16B thence over the pulley 16C which is directly behind the pulley 16A and then around the drum 14A. The cord is attached to the index 19 and, as the carriage moves relatively thereto, the cord rotates the drum 14A. This cylinder 14, which can be removed in a minute, contains the spare bands of paper.

The scale 12 moves in front of a fixed index 18 whereas the index 19 rigid on the head 7 shifts in front of the scale 13. A tracer or pencil holder 20, mounted on a fixed centre but adjustable in a vertical plane by means of a pressure screw co-operates with the recording cylinder 14. The whole of the mobile pieces are balanced by a counterweight 21 so as to avoid errors due to the weight of these pieces.

It is easy to see under these conditions that by manipulating the hand wheel 9 the head 7 descends in the tube 4 and exerts, through the intermediary of the spring 6, a pressure on the piston 1 which tends to force its way into the ground. The reading of the force is made on the scale 13 whereas that of the penetration of the piston is taken on the scale 12.

The pressure and penetration are moreover inscribed on the recording cylinder 14 by the tracer 20; the pressures being indicated by abscissae and the penetrations by ordinates.

This apparatus may if desired be completed by a cylinder destined to measure the speed of penetration. In this case a second cylinder 22 is provided which is actuated by a clockwork movement of some kind. A bent rod 23 connected to the extremity 5 of the piston and guided at its upper end, carries a tracer 24 which inscribes the penetrations of the piston at the moments they take place.

The apparatus also comprises a handle 25.

The diagrams obtained with the aid of the apparatus enable the limit of elasticity or fracture of the ground to be determined quickly and constitute permanent documents. The manipulation of the apparatus requires no scientific knowledge; its small size and light weight make it portable and enable it to be easily lowered to the bottom of a well for example, to the depth provided for the foundations.

It is advisable to mention that the essential advantage of the apparatus is that it is portable and of small size. Its height is generally 78 cms. and its total weight 11.7 kgs.

What I claim is:

1. In a portable apparatus capable of measuring the resistance of the ground, in combination, a piston, a pressure member whereby a pressure is exerted on the said piston in order to produce its penetration into the ground, a spring interposed between the piston and the pressure member, means whereby the vertical movements of the piston, of the pressure member and of the spring are guided, a carriage made rigid with the piston, a double scale carried by the said carriage, a fixed index cooperating with one of the scales whereby the penetrations performed are indicated, a second index rigid with the pressure member and moving in front of the other scale, whereby the pressures exerted on the piston are indicated, a recording cylinder carried by the said carriage, means whereby the said cylinder is rotated by the movement of displacement of the pressure member relative to the piston, a tracer in front of which the recording cylinder moves vertically during the penetration of the piston, turning about its axis upon said displacement of the pressure member.

2. Apparatus capable of measuring the resistance of ground comprising in combination, a piston, means for exerting pressure on the piston and causing it to exert a pressure upon and penetrate the ground, a carriage operatively connected to the piston and responsive to the movement thereof, a recording instrument mounted upon the carriage, means actuating it responsive to pressure changes exerted upon the piston, a stylus adapted to trace a curve on the recording instrument indicating both the pressure upon and penetration of the piston, and means attached to said carrier for counterbalancing the weight of said carriage.

CONSTANT PIERRE JEAN MARIE
VAN der MEER.